United States Patent
Raveendran

(10) Patent No.: US 9,794,771 B2
(45) Date of Patent: Oct. 17, 2017

(54) NODE SELECTION IN NETWORK TRANSITIONS

(71) Applicant: Cisco Technology, Inc., San Jose, CA (US)

(72) Inventor: Sujesh Kumar Raveendran, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/448,318

(22) Filed: Jul. 31, 2014

(65) Prior Publication Data
US 2016/0037328 A1    Feb. 4, 2016

(51) Int. Cl.
*H04W 8/08* (2009.01)
*H04W 88/06* (2009.01)
*H04W 48/00* (2009.01)
*H04W 84/12* (2009.01)
*H04W 24/04* (2009.01)

(52) U.S. Cl.
CPC ............ *H04W 8/08* (2013.01); *H04W 48/17* (2013.01); *H04W 24/04* (2013.01); *H04W 84/12* (2013.01); *H04W 88/06* (2013.01)

(58) Field of Classification Search
CPC . H04L 63/029; H04L 63/0272; H04L 63/164; H04W 36/0038; H04W 12/02; H04W 76/002; H04W 80/04; H04W 8/08; H04W 48/17; H04W 24/04; H04W 88/06; H04W 84/12
See application file for complete search history.

(56) References Cited

U.S. PATENT DOCUMENTS

| | | | |
|---|---|---|---|
| 2011/0216743 A1* | 9/2011 | Bachmann | H04L 63/164 370/331 |
| 2011/0261787 A1* | 10/2011 | Bachmann | H04L 63/029 370/331 |
| 2012/0275430 A1* | 11/2012 | Wang | H04W 24/04 370/331 |
| 2012/0307797 A1* | 12/2012 | Yuan | H04W 36/0022 370/331 |
| 2013/0135990 A1* | 5/2013 | Draznin | H04W 48/17 370/221 |
| 2014/0146747 A1* | 5/2014 | Dragan | H04L 61/106 370/328 |
| 2014/0259012 A1* | 9/2014 | Nandlall | H04W 4/003 718/1 |

\* cited by examiner

*Primary Examiner* — Noel Beharry
*Assistant Examiner* — Ruihua Zhang
(74) *Attorney, Agent, or Firm* — Patterson + Sheridan, LLP

(57) ABSTRACT

The present disclosure relates to methods, systems and apparatuses for transferring a user equipment (UE) connected to a first network (e.g., a LTE network) to a second network (e.g., a Wireless Local Area Network, or WLAN). In particular, the present disclosure teaches methods, systems and apparatuses for selecting and connecting the UE to a gateway (e.g., an evolved packet data gateway (ePDG)) and a network apparatus (e.g., a packet data network gateway (PGW)). By sending the IP address of the gateway and the network apparatus to the UE before the UE disconnects from the first network (e.g., via a Protocol Configuration Option (PCO) message), the UE is able to connect to the gateway and network apparatus directly without consulting a DNS server or a Home Subscriber Server. These techniques can be useful when no DNS server is available and in virtualized, cloud-based networks.

16 Claims, 10 Drawing Sheets

500

502 Container ID: 0x0003 (IPv6-DNS-Server)
Container length: 0x10 (16)
Container contents: <<DNS Server Information>>

504 Container ID: 0xFF00 (Operator Specific)
Container length: <<Length>>
Container contents: <<Octal>> (MCCMNC: 311480; Op Specific PCO)

506 Container ID: 0xFF01 (Operator Specific)
Container length: <<Length>>
Container contents: (ePDG FQDN)

508 Container ID: 0xFF02 (Operator Specific)
Container length: <<Length>>
Container contents: (ePDG IP)

510 Container ID: 0xFF02 (Operator Specific)
Container length: <<Length>>
Container contents: (PGW IP)

FIG. 5

NODE SELECTION IN NETWORK TRANSITIONS

FIELD OF THE DISCLOSURE

The present disclosure relates generally to systems and methods for node selection in a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a regional or geographic area, with multiple cells arranged to provide contiguous radio coverage over a larger regional or geographic area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such devices can connect to a network (e.g., the Internet). When these devices initially connect to a network, gateways in the network select downstream network nodes for establishing network connections or network sessions with the devices.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 5 is a block diagram of an exemplary PCO message which includes information regarding an ePDG and PGW, in accordance with certain embodiments.

DESCRIPTION OF EXAMPLE EMBODIMENTS

Summary of the Invention

Figure 1:
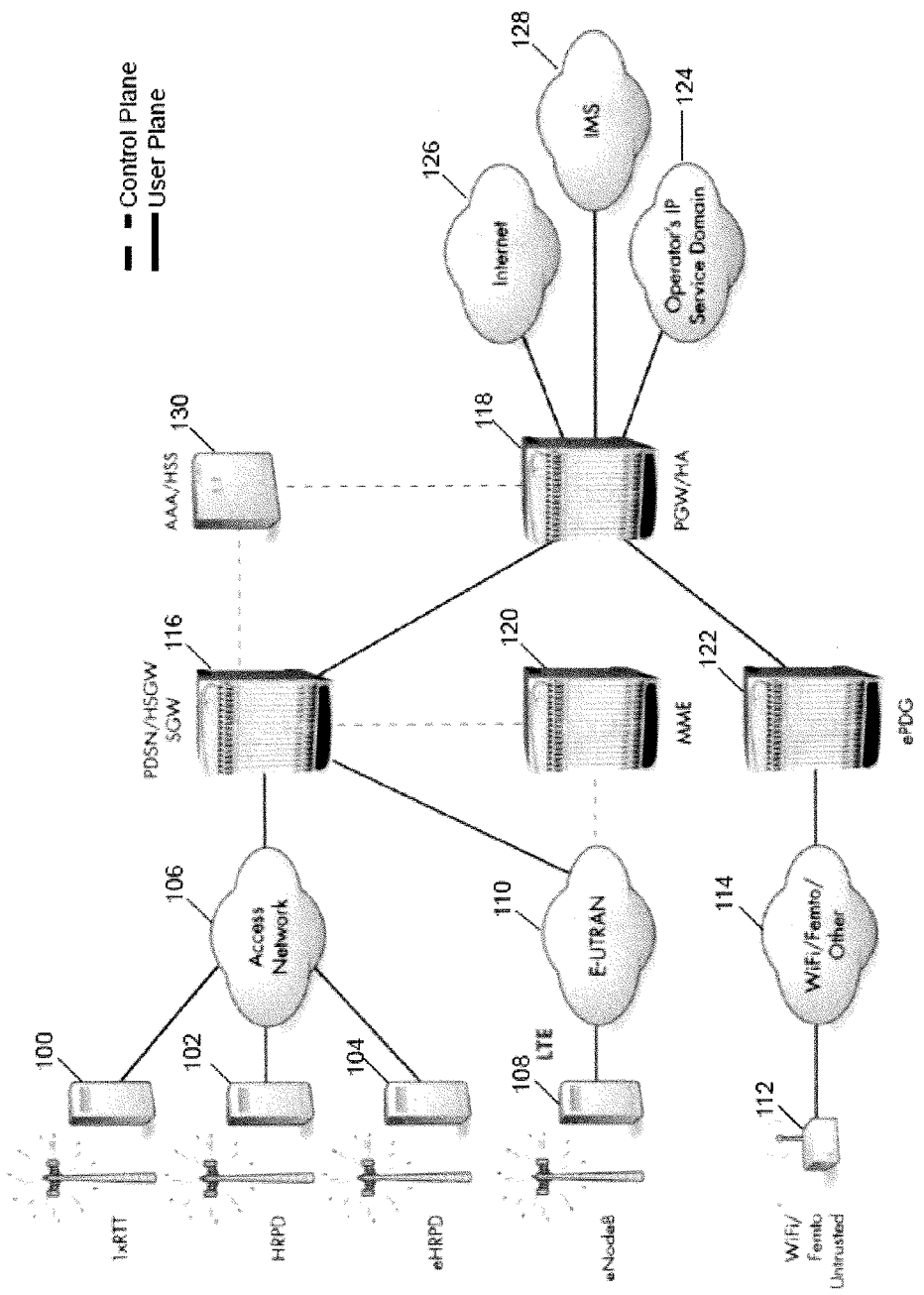
FIGS. 1-2 illustrate communication networks including a long term evolution (LTE) topology that implements node selection mechanisms in accordance with certain embodiments.

The present disclosure is directed at systems, methods and media for implementing node selection in network transitions.

In one aspect, the present disclosure is directed at a network apparatus in a core network, comprising an interface configured to communicate with a user equipment (UE) via a wireless network, and a processor in communication with the interface. The network apparatus can be configured to: receive information from the UE, wherein the UE is connected to the network apparatus via a first network; determine, based on the received information, a list of available gateways that can serve the UE if the UE connects to a second network, wherein the first network and the second network employ different access technologies; identify a candidate gateway out of the list of available gateways; and send a network address associated with the candidate gateway to the UE via the first network.

In some embodiments, the first network can be a cellular access network, and the network apparatus can be configured to send the network address associated with the candidate gateway to the UE via a Protocol Configuration Option (PCO) message.

In some embodiments, the first network can be a Long Term Evolution (LTE) network, the second network can be a Wireless Local Area Network (WLAN), and the gateways can be evolved packet data network gateways (ePDGs).

In some embodiments, the network apparatus can be a packet data network gateway (PGW).

In some embodiments, the network apparatus can be further configured to send to the UE a Fully Qualified Domain Name (FQDN) associated with the candidate gateway and an Internet Protocol (IP) address associated with the network apparatus.

In some embodiments, the network apparatus can be configured to identify the candidate gateway out of the list of available gateways based on load information associated with the list of available gateways.

In some embodiments, at least one of the network apparatus and at least some of the gateways in the list of available gateways can be implemented as virtual software instances in a cloud-based environment.

In a second aspect, the present disclosure is directed at a method for transferring a user equipment (UE) connected to a first network to a second network, the method comprising: receiving, at a network apparatus, information from the UE, wherein the UE is connected to the network apparatus via the first network; determining, based on the received information, at the network apparatus, a list of available gateways that can serve the UE if the UE connects to the second network, wherein the first network and the second network employ different access technologies; identifying, at the network apparatus, a candidate gateway out of the list of available ePDGs; and sending, from the network apparatus, a network address associated with the candidate gateway to the UE via the first network.

In some embodiments, the first network can be a cellular access network, and the network address associated with the candidate gateway can be sent from the network apparatus to the UE via a Protocol Configuration Option (PCO) message.

In some embodiments, the first network can be a Long Term Evolution (LTE) network, the second network can be a Wireless Local Area Network (WLAN), and the gateways can be evolved packet data network gateways (ePDGs).

In some embodiments, the network apparatus can be a packet data network gateway (PGW).

In some embodiments, the method can further comprise sending, from the network apparatus to the UE, a Fully Qualified Domain Name (FQDN) associated with the candidate gateway and an Internet Protocol (IP) address associated with the network apparatus.

In some embodiments, the identification of the candidate gateway out of the list of available gateways can be based on load information associated with the list of available gateways.

In some embodiments, at least one of the network apparatus and at least some of the gateways in the list of available gateways can be implemented as virtual software instances in a cloud-based environment.

In a third aspect, the present disclosure is directed at a method for transferring a user equipment (UE) connected to a first network to a second network, the method comprising: connecting the UE to the first network; receiving, at the UE from a network apparatus, via the first network, (i) a first network address associated with a gateway that can serve the UE if the UE connects to the second network, wherein the first network and the second network employ different access technologies, and (ii) a second network address associated with the network apparatus; terminating the UE's connection to the first network; and sending, from the UE, via the second network, a request to connect to (i) the gateway associated with the first IP address, and (ii) the network apparatus associated with the second network address.

In some embodiments, the first network can be a cellular access network, and the UE can receive the first network address and the second network address via a Protocol Configuration Option (PCO) message.

In some embodiments, the first network can be a Long Term Evolution (LTE) network, the second network can be a Wireless Local Area Network (WLAN), the gateways can be evolved packet data network gateways (ePDGs), and the network apparatus can be a packet data network gateway (PGW).

In some embodiments, the request sent from the UE via the second network can comprise a first message requesting a connection with the gateway associated with the first IP address, and a second message requesting a connection with the network apparatus.

In some embodiments, the request can comprise an Internet Key Exchange (IKEv2) authentication request, and the second IP address can be included in an ID_KEY_ID field.

In some embodiments, at least one of the network apparatus and the gateway can be implemented as virtual software instances in a cloud-based environment.

Overview

FIG. 1 illustrates a communication network that includes a node selection mechanism in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wi-Fi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100 and HRPD 102, the HSGW functionality can be used with eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the Wi-Fi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

Home Subscriber Server (HSS) 130 can be a master user database that supports IMS network entities that handle calls. HSS 130 stores subscription-related information (subscriber profiles), performs authentication and authorization of the user, and can provide information about the subscriber's location and IP information. As used in the present node selection mechanisms, HSS 130 responds to subscription requests from mobility management entity (MME) 120. HSS 130 can provide subscription data using Update-Location Answer (ULA) responses by accessing its user database and providing the user information to MME 120. AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA functionality of AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages node selection, session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for node selection of an SGW and PGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

ePDG 122 is responsible for interworking between the EPC and fixed non-3GPP access technologies such as Wi-Fi (e.g., a Wireless Local Area Network, or WLAN, based technologies). The ePDG 122 can use IPSec/IKEv2 to provide secure access for the UE to the EPC network. In addition, in some embodiments, the ePDG can use Proxy Mobile IPv6 (PMIPv6) to interact with the PGW when the mobile subscriber is roaming in an untrusted non-3GPP system. In other embodiments, the ePDG can use GTPv2 to interact with the PGW. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
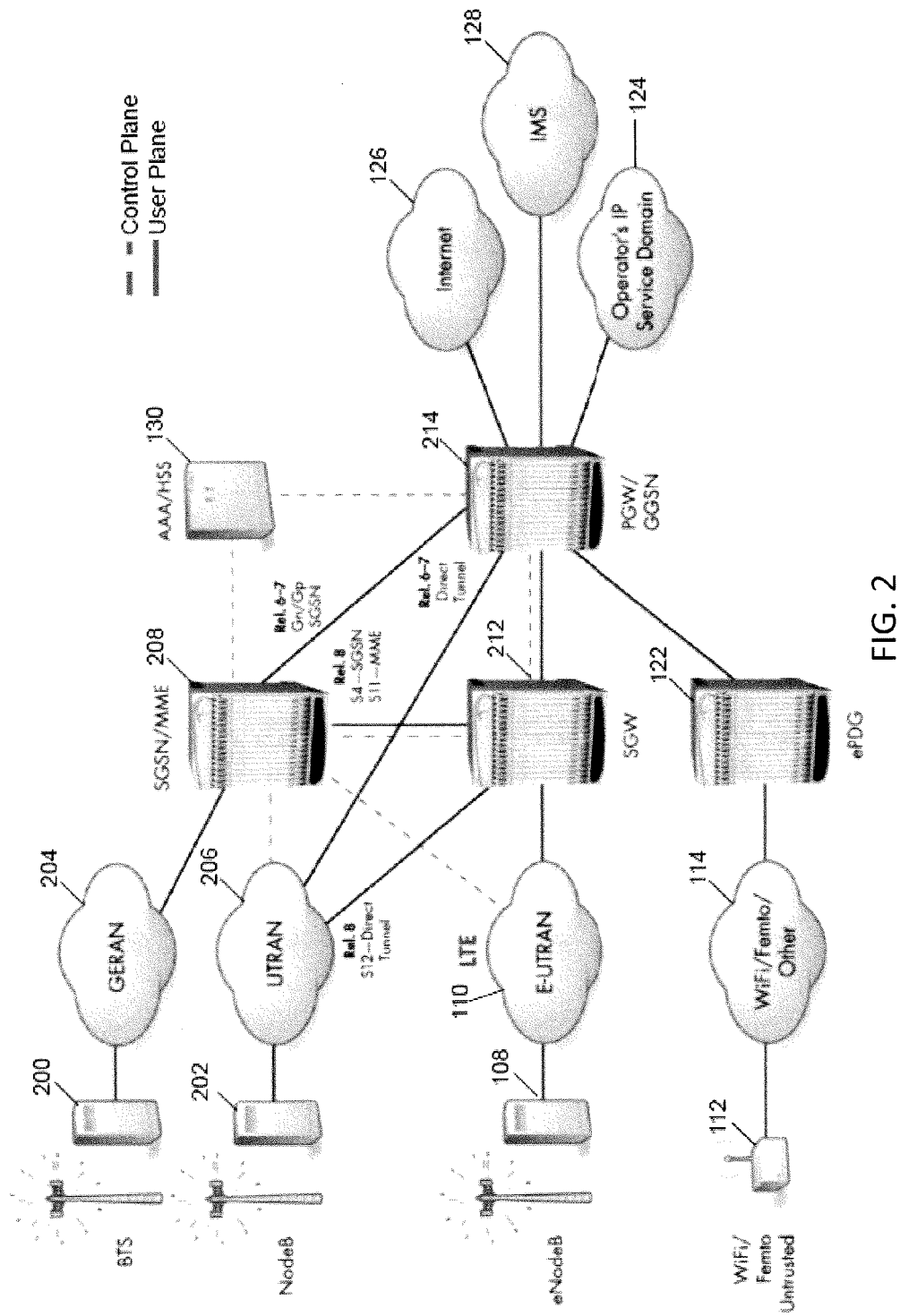

FIG. 2 illustrates a communication network that implements a node selection mechanism with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214. As used in the specification and the claims, the term "cellular access technology" can refer to access technologies and standards such as Universal Mobile Telecommunications Systems (UMTS), Long Term Evolution (LTE), Global System for Mobile Communications (GSM), IS-95, and IS-2000. The term "cellular access network" can refer to a wireless network that employs a cellar access technology.

SGSN/MME 208 can access and maintain information relating to the communication session, the subscriber, the available network nodes, the radio bearers, and the policies relating to the communication session. SGSN/MEE 208 may be used to provide various services to a mobile device and implement node selection for mobile devices on initial attach. The communication networks also allow provision of applications such as VoIP, streaming video, streaming music, mutli-user gaming, location based services, and a variety of content delivered to a mobile node. Residing within gateway 208 can be one or more network processing units, line cards, as well as packet and voice processing cards.

The networks illustrated in FIGS. 1 and 2 can be implemented using physical, dedicated network apparatuses. Alternatively, however, the networks can also be implemented using virtual network apparatuses in a cloud environment. In a cloud-based implementation, the illustrated network nodes (e.g., the MME, ePDG, PGW, SGW, AAA/HSS, etc.) may be implemented as software instances running on hardware machines. These hardware machines may be widely geographically dispersed, and may also host many other software instances associated with other network nodes. The software instances implementing the illustrated network nodes may be transferred freely and seamlessly from one hardware machine to another, without warning and without affecting the service experienced by the UE. The software instances can be transferred from one hardware machine to another based on, for example, the hardware machine's processing load, maintenance or outage schedule, time of day, connection environment, and other factors.

Figure 3:
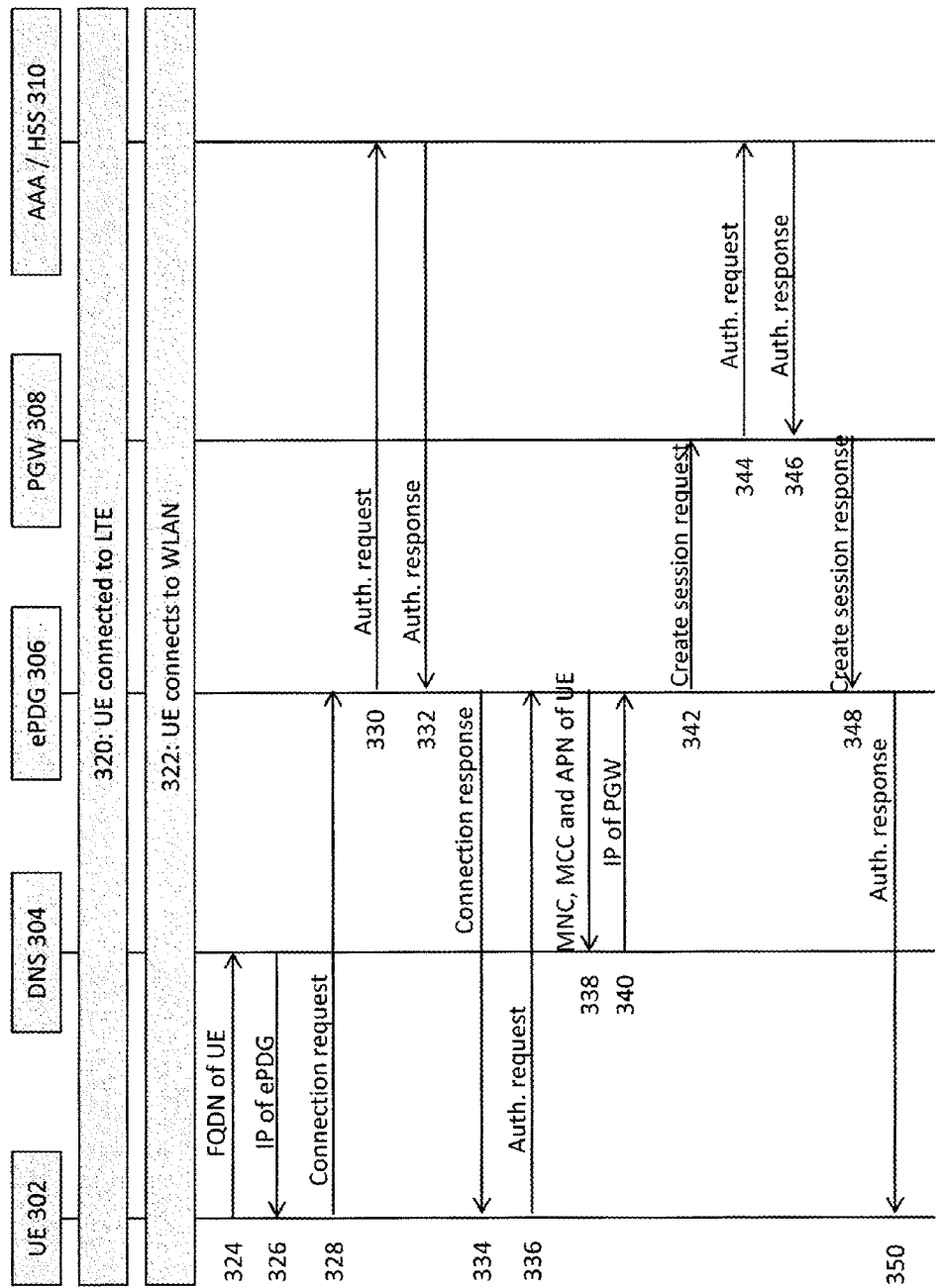
FIG. 3 illustrates an exemplary signaling protocol which uses a DNS server to identify an ePDG and a PGW with which a UE should connect, in accordance with certain embodiments.

FIG. 3 is an exemplary call flow by which a UE that is transitioning between a LTE network and a WLAN network (e.g., Wi-Fi) can be connected to a PGW and an ePDG in accordance with certain embodiments. FIG. 3 depicts signals being passed between five entities: a UE 302, a Domain Name System (DNS) Server 304, an ePDG 306, a PGW 308, and a AAA/HSS 310. At a first step 320, the UE 302 is connected to a LTE network via an E-UTRAN network, MME, SGW, and PGW as depicted in FIGS. 1 and 2. The UE 302 desires to transition from the LTE network to a WLAN network. Therefore, at step 322, the UE 302 connects to a WLAN network and, in some embodiments, can disconnect from the LTE network. If a disconnection from the LTE network occurs, the disconnection can be effected by a network node (e.g., the MME, SGW, and/or PGW) sending a message to UE 302 indicating that its session is being discontinued, and then purging, at the network node, some or all cached information regarding the UE's communication session. A transition from a LTE network to a WLAN network can take place because of many reasons. For example, the UE can be configured with a local policy such that when the Service Set Identifier (SSID) signal from a WLAN is present, and the signal strength is low in LTE but good in the WLAN, then the UE will automatically transition to the WLAN network. Alternatively, an Access Network Discovery and Selection Function (ANDSF), which is an entity within an evolved packet core (EPC), can instruct a UE to transition from a LTE network to a WLAN network. In some cases, a user of a UE can explicitly select to connect to the WLAN network over the LTE network. The connection to a WLAN network can be effected by the UE 302 connecting to a nearby Access Point (AP). The UE 302 now needs to identify and connect with an ePDG and PGW in the WLAN network. As described above in connection with FIG. 1, an evolved packet data gateway (ePDG) is responsible for interworking between the EPC and fixed non-3GPP access technologies such as Wi-Fi (e.g., 802.11) and can use IPSec/IKEv2 to provide secure access to the EPC network, while a packet data network gateway (PGW) acts as an interface between an EPC network and other packet data networks, such as the Internet or SIP-based IMS networks (fixed and mobile).

At step 324, the UE 302 can generate a Fully Qualified Domain Name (FQDN) containing an identifier that shall uniquely identify the Public Land Mobile Network (PLMN) where it is located. The FQDN can comprise the Mobile Network Code (MNC) and Mobile Country Code (MCC) associated with the UE 302. In some embodiments, the FQDN can take the form "epdg.epc.<MNC>.<MCC>.pub.3gppnetwork.org." The UE 302 can then send the generated FQDN to DNS server 304. The DNS server 304 can be configured to identify, based on the received FQDN, a list of candidate ePDGs that can serve the UE 302 (e.g., ePDGs that are in or near the PLMN corresponding to the UE), and can select a single ePDG out of the list of candidate ePDGs to serve the UE. In some embodiments, the DNS server can use load balancing to select an ePDG (e.g., by selecting the least loaded ePDG to serve the UE). At step 326, once the DNS server 304 has selected an ePDG, in this case, ePDG 306, DNS server 304 can send the IP address of the selected ePDG 306 to UE 302.

At step 328, UE 302 can use the received IP address of ePDG 306 to send a connection request to ePDG 306. The connection request can include the MNC, MCC, and an Access Point Name (APN) associated with the UE 302. At step 330, ePDG 306 can send an authentication request to AAA/HSS 310 to authenticate UE 302. Assuming authentication is successful, AAA/HSS 310 can send, at step 332, an authentication response back to ePDG 306. At step 334, ePDG 306 can then send a connection response back to UE 302.

At this point, UE 302 is now connected to ePDG 306, but now needs to identify and connect with a PGW. At an optional step 336, UE 302 sends another message to ePDG 306, this time seeking to connect to a PGW. In some embodiments, no second message is necessary at step 336 because ePDG 306 is already in possession of the MNC, MCC, and APN associated with the UE 302, which is all the information ePDG 306 needs to retrieve a PGW from DNS server 340. In other embodiments, this second message can be used to further authenticate UE 302 before ePDG 306 connects the UE 302 with a PGW. At step 338, ePDG 306 can send the MNC, MCC, and an Access Point Name (APN) associated with the UE 302 to DNS server 304. DNS server 304 can again identify a list of potential PGW gateways that can serve UE 302, and identify one PGW (in this case, PGW 308) out of the list. In some embodiments, the identification of the one PGW can be based on load balancing, as discussed above in relation to selection of an ePDG. At step 340, DNS server 340 can send the IP address of the selected PGW gateway (PGW 308) back to ePDG 306. At step 342, ePDG 306 can then send a create session request to PGW 308 using the IP address received at step 340. At step 344, PGW 308 can send an authentication request to AAA/HSS 310. Assuming authentication is successful, AAA/HSS 310 can then send, at step 346, an authentication response back to PGW 308. At step 348, PGW 308 can send a create session response back to ePDG 306 confirming that the session can be created. At step 350, ePDG 306 can send an authentication response back to UE 302 verifying that the connection with PGW 308 has been established. At the conclusion of this process, UE 302 has identified and established a connection with ePDG 306, and UE 302/ePDG 306 has identified and established a connection with PGW 308.

In some embodiments, instead of relying on a DNS server 304 to obtain the IP address of a PGW 308 to connect with, ePDG 306 can rely on information provided by AAA/HSS 310 to identify the IP address of a PGW 308. For example, the authentication response transmitted from AAA/HSS 310 to ePDG 306 at step 332 can contain, in some embodiments, the IP address of a PGW 308 to connect to. In these embodiments, no second query to DNS server 304 is required.

FIG. 3 presents a simplified connection method, but alternative embodiments are possible. For example, the connection request sent by the UE 302 at step 328 can be an IKEv2 AUTH_REQ message according to the IKEv2 security protocol. The connection responses sent back to UE 302 at steps 334 can be an IKEv2 AUTH_RESP messages. The Auth. Request messages sent at 330 and 344, and Auth. Response messages sent at 332 and 346, can be Diameter EAP request and Diameter EAP response messages, according to the Diameter Extensible Authentication Protocol (EAP). In some embodiments, the optional authentication message 336 and the authentication response 350 can be encrypted EAP authentication messages passed from AAA/HSS 310 to the UE 302 via the intervening network apparatuses, such as ePDG 306. Multiple additional rounds of signaling may be required to establish a connection with ePDG 306 and with PGW 308, according to different embodiments, and the order of messaging flows may also differ depending on the connection protocol.

The embodiments described in relation to FIG. 3, however, can have drawbacks. First, some smaller wireless operators may not employ a DNS server 304, leaving UEs with no way to identify and connect to an ePDG and PGW. Second, ePDG 306, PGW 308, and in some instances, AAA/HSS 310 can correspond not to physical devices, but virtual network components hosted in the cloud. In other words, as discussed previously, ePDG 306 and/or PGW 308 can correspond only to software instances hosted on hardware machines that can be widely geographically distributed, wherein the hardware machines can also host a plurality of other software instances (e.g., other PGWs, ePDGs, or AAA/HSS). Virtual, cloud-based ePDGs and PGWs can complicate the handover process of a UE from a LTE network to a WLAN network. In a non-cloud-based network, when ePDG 306 queries DNS server 304 for the IP of a PGW to connect to, and provides the MNC, MCC and APN of the UE as part of its query (i.e., step 338), ePDG 306 can be reasonably confident that the PGW returned by DNS server 304 will be the same PGW that UE 302 had previously been connected to while attached to the LTE network. UE 302 should retain the same PGW during its WLAN session as its LTE session to ensure that its cached settings and communication flows are not disrupted. However, current connection protocols generally do not account for cloud-based network architecture, with the result that a query to DNS server 304 at step 338 may return an IP address of a PGW that is different from the IP address of the PGW that had been serving the UE during its LTE session. This difference can disrupt communication flows, resulting in interrupted sessions and applications and a poor user experience.

Figure 4:
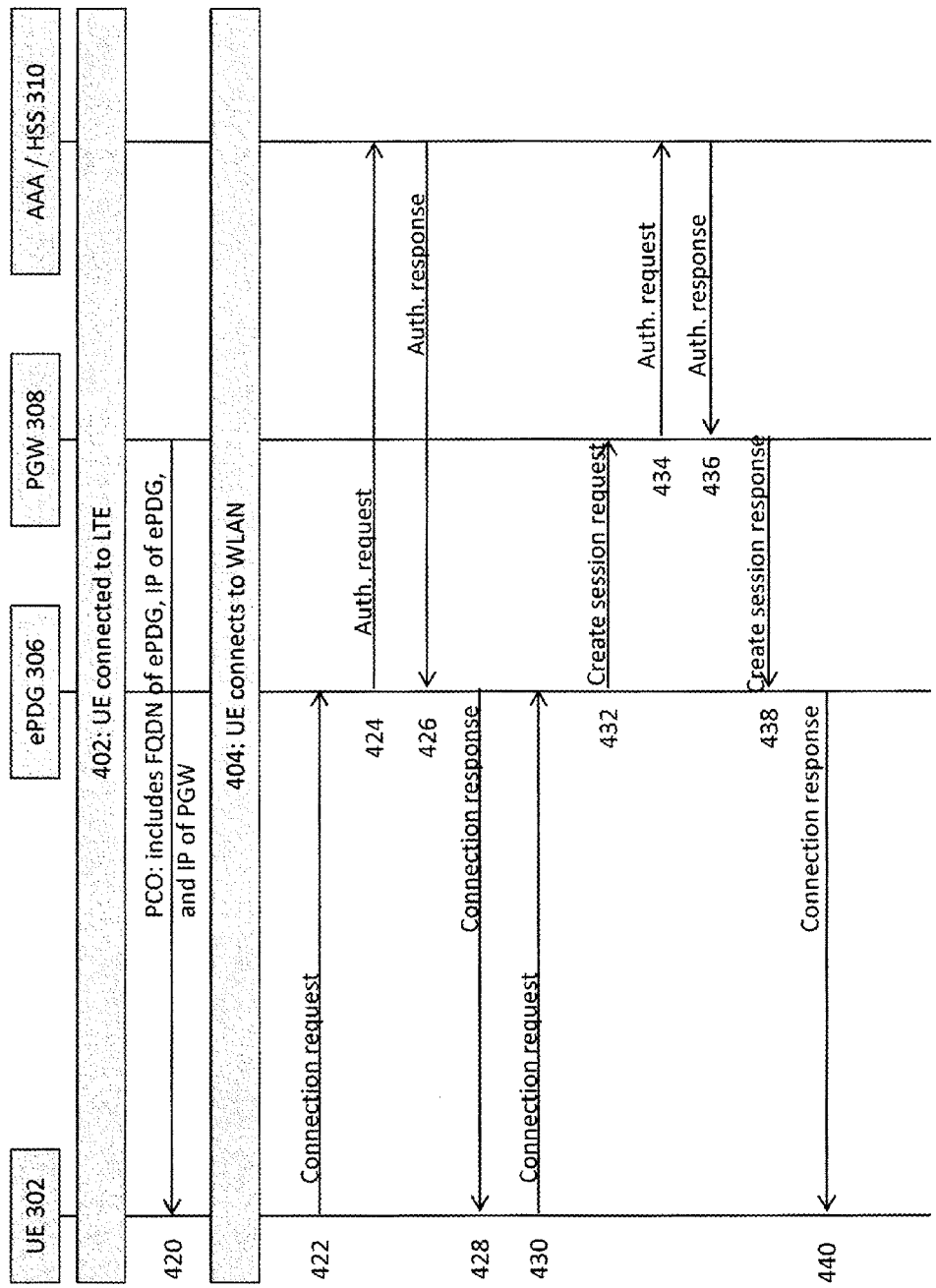
FIG. 4 illustrates an alternative, exemplary signaling protocol which uses a Protocol Configuration Option (PCO) message to identify an ePDG and a PGW with which a UE should connect, in accordance with certain embodiments.

FIG. 4 presents an alternate embodiment that mitigates some of the drawbacks identified above for FIG. 3. FIG. 4 depicts signals being passed between four entities: UE 302, ePDG 306, PGW 308, and AAA/HSS 310. In this embodiment, no DNS server 304 is required. At step 402, the UE 302 is connected to the LTE network and, among other network nodes, PGW 308. While UE 302 is still connected to the LTE network, PGW 308 can generate a list of candidate ePDGs that UE 302 can connect to in the event that UE 302 transitions to a WLAN network, and identify a single ePDG out of that list to send to UE 302. At step 420, PGW 308 can send to UE 302 information associated with the identified ePDG, such as the FQDN and IP of the ePDG (in this case, ePDG 306). PGW 308 can also send its own IP address to UE 302. In some embodiments, PGW 308 can send this information to UE 302 via a Protocol Configuration Option (PCO) message. In some embodiments, PGW 308 can send this information when the UE 302 initially attaches to the LTE network and to PGW 308.

At step 404, UE 302 connects to a WLAN network. In some embodiments, UE 302 can also disconnect from the LTE network at this point. As before, the disconnection can be effected by a network node (e.g., the MME, SGW, or PGW) sending a message to UE 302 indicating that its session is being discontinued, and then purging, at the network node, some or all cached information regarding the UE's communication session. The connection to a WLAN network can be effected by the UE 302 connecting to a nearby Access Point (AP). In this case, UE 302 retains the FQDN and IP of ePDG 306 and the IP of PGW 308. As a result, UE 302 does not need to query a DNS server for this information—it can proceed to connect with ePDG 306 and PGW 308 directly. At step 422, UE 302 can send a connection request to ePDG 306 using the IP of ePDG 306. At step 424, ePDG 306 can send an authentication request to AAA/HSS 310. Upon successful authentication, AAA/HSS 310 can send, in step 426, an authentication response back to ePDG 306. At step 428, ePDG 306 can send a connection response back to UE 302 confirming that the connection has been established. At an optional step 430, UE 302 can send a second message to ePDG 306, this time to connect to PGW 308. This second connection request can, in some embodiments, contain the IP address of the PGW 308 to which the UE 302 desires to connect. Alternatively, in other embodiments, no second connection request is necessary as the UE 302 could have sent the IP address of the PGW 308 to which the UE 302 desires to connect with its first connection request at step 422. Whether ePDG 306 receives the IP address of the PGW 308 through the first connection request at step 422, or through the optional second connection request at step 424, ePDG 306 can then use this IP address to send, at step 432, a create session request to PGW 308. At step 434, PGW 308 can send an authentication request to AAA/HSS 310. Upon successful authentication, AAA/HSS 310 can send, at step 426, an authentication response back to PGW 308. At step 438, PGW 308 can send a create session response to ePDG 306. At step 440, ePDG 306 can send a connection response back to UE 302, confirming that the connection with PGW 308 has been established. At the conclusion of this process, UE 302 has identified and established a connection with ePDG 306, and UE 302/ePDG 306 has identified and established a connection with PGW 308.

By obtaining the IP addresses of ePDG 306 and PGW 308 while UE 302 is still connected to the LTE network, this signaling protocol obviates the need for a DNS server 304 to obtain the addresses of an ePDG and PGW. Furthermore, by sending the IP of a PGW to UE 302 while UE 302 is still connected to the LTE network, this signaling protocol helps to ensure that UE 302 will remain connected to the same PGW during its WLAN session as during its LTE session. In some embodiments, PGW 308 can also be configured to select the ePDG to send to UE 302 in step 420 based on a load balancing algorithm. For example, PGW 308 can select the ePDG that is the least loaded of all the candidate ePDGs that can serve UE 302. Other load balancing algorithms, such as a round robin allocation of ePDGs to incoming connection requests, are also possible. To accomplish this, PGW 308 can maintain a database of available ePDGs, their FQDNs, their IP addresses, and their load levels. Load levels can be measured using a variety of parameters, including number of processes being hosted, number of connections and/or subscribers being hosted, CPU processor load, response delay time, or some other metric.

As with FIG. 3, FIG. 4 presents a simplified connection method, but alternative embodiments are possible. For example, the connection requests sent by the UE 302 at steps 422 and 430 can be IKEv2 AUTH_REQ messages according to the IKEv2 security protocol. The connection responses sent back to UE 302 at steps 428 and 440 can be IKEv2 AUTH_RESP messages. The Auth. Request messages sent at 424 and 434, and Auth. Response messages sent at 426 and 436, can be Diameter EAP request and Diameter EAP response messages, according to the Diameter Extensible Authentication Protocol (EAP). Multiple additional rounds of signaling may be required to establish a connection with ePDG 306 and with PGW 308, according to different embodiments, and the order of messaging flows may also differ depending on the connection protocol. Some rounds of signaling may also be combined or integrated. For example, instead of sending out separate Auth. Request messages at 424 and 434, the UE 302 can send a single connection request that both connects UE 302 to ePDG 306 and instructs ePDG 306 to establish a session with PGW 308. In this embodiment, the single connection request can contain the IP address of PGW 308 so that ePDG 306 can establish the proper connection.

In some embodiments, ePDG 306 can be configured to work with both communication protocols described above in relation to FIG. 3 and FIG. 4. For example, if the IKEv2 communication protocol is used, the first connection request from UE 302 to ePDG 306 (i.e., step 328 in FIG. 3 and step 422 in FIG. 4) can be an IKEv2 AUTH_REQ message. The IKEv2 AUTH_REQ message has two alternate fields that can be used: an ID_RFC822_ADDR field that can be used to contain Network Access Identifier (NAI) information associated with the UE 302, and an ID_KEY_ID field that can be used to contain an IP address of a PGW. If UE 302 is in possession of the IP address of a PGW to which it wishes to connect (as is the case in FIG. 4), UE 302 can send an IKEv2 AUTH_REQ message with the ID_KEY_ID field populated with the IP address of the PGW. In some embodiments, the ID_KEY_ID field can also contain the NAI of the UE 302 (the NAI can be used by the ePDG to initiate session processing). If, however, UE 302 is not in possession of the IP address of a PGW, UE 302 can instead populate the ID_RFC822_ADDR field with its NAI information. This NAI information can include the UE 302's MCC and MNC, which can be used to query a DNS server to select a PGW for UE 302, as described above in relation to FIG. 3. When ePDG 306 receives the IKEv2 AUTH_REQ message from UE 302, it can examine the ID type of the IKEv2 AUTH_REQ message. If the ID type of the IKEv2 AUTH_REQ message is ID_KEY_ID, and if the ID_KEY_ID field is populated with a valid IP address (and, in some embodiments, valid NAI information), ePDG 306 can directly send a create session request to the PGW indicated by that IP address and NAI. If, however, the ID type of the IKEv2 AUTH_REQ message is ID_RFC822_ADDR instead of ID_KEY_ID, and the message includes valid NAI information, ePDG 306 can select a PGW using the methods described above in FIG. 3. In this way, ePDG 306 can implement both the signaling protocol of FIG. 3 and FIG. 4.

Furthermore, while FIGS. 3 and 4 have been described in relation to transferring a UE from a LTE network to a WLAN network, the communication protocols in FIGS. 3 and 4 can be adapted to transitioning a UE from any first network to any second network. The first network need not be a LTE network, but can be any network that uses a PGW, including any of the networks types discussed above in relation to FIGS. 1 and 2. For example, the first network can be any cellular access network, employing any cellular access technology mentioned above. In the case of a 3G network, it could be either a Packet Data Network Gateway (PGW) or a Gateway GPRS Support Node (GGSN) that allocates IP addresses. The second network need not be a WLAN network, but can be any type of fixed non-3GPP access technology that uses an ePDG. For example, a data-card or data-usb with a Universal Subscriber Identity Module (USIM) which is connected to a tablet or a laptop can also connect to an ePDG through a fixed broadband line.

FIG. 5 presents a block diagram of an exemplary PCO message 500 that could be used by PGW 308 to transmit information regarding itself and ePDG 306 to UE 302. The PCO message 500 could comprise multiple "containers," designated 502, 504, 506, 508 and 510. Each container can comprise a container ID, which specifies the type of content it carries, a container length, which specifies the length of the container in bits, and the container contents. For example, container 502 has the container ID 0x0003, which corresponds to a container designated to contain IPv6 DNS Server information. The exemplary container 500 can contain three additional containers: containers 506, 508 and 510. Container 506 can set as its operator ID the code 0xFF01, which is the code used to pass operator specific information. In this case, container 506 can contain the FQDN of ePDG 306. Similarly, container 508 can contain the IP address of ePDG 306, while container 510 can contain the IP address of PGW 510.

Figure 6:
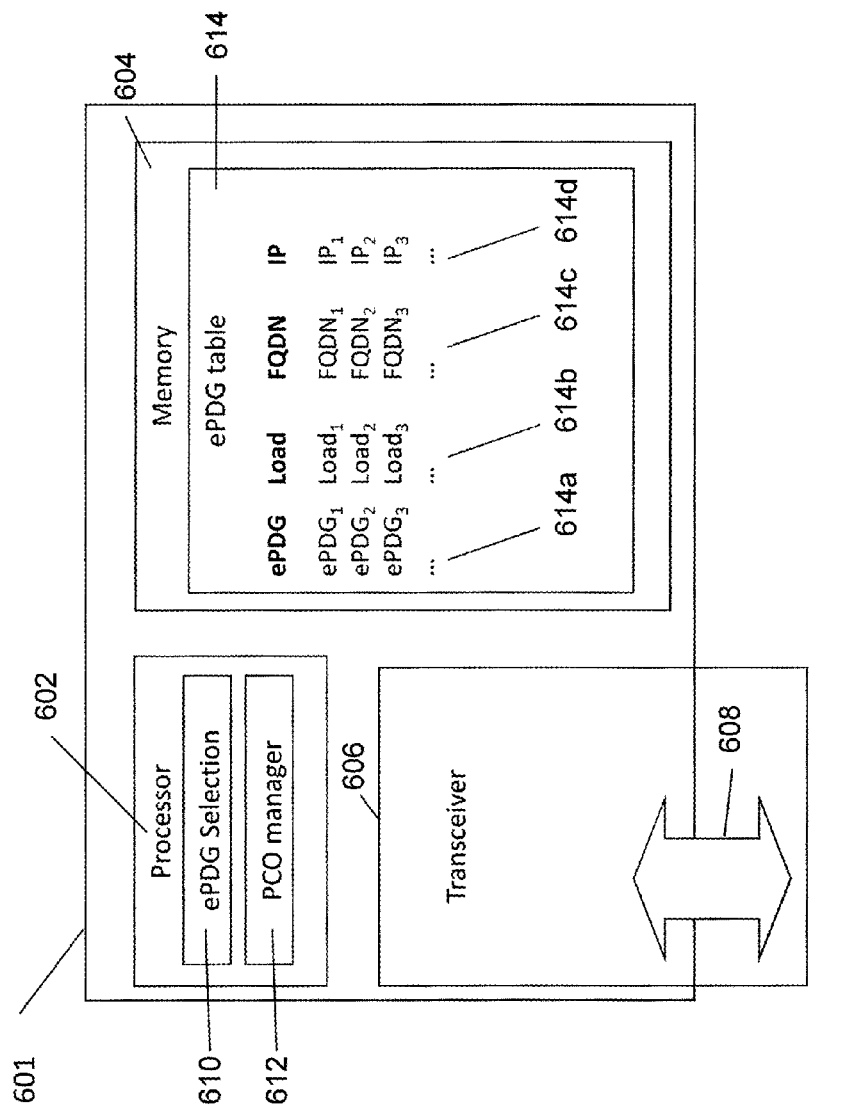
FIG. 6 is a logical diagram of an exemplary PGW that can select and send information regarding an ePDG to a UE, in accordance with certain embodiments.

FIG. 6 illustrates a logical view 600 of a PGW 308 that implements a connection protocol of FIG. 4, in accordance with certain embodiments. The PGW 308 can include a transceiver 606 that implements an interface 608, a processor 620, and a memory 604. The processor can implement an ePDG selection module 610 and a PCO manager module 612. The memory can contain an ePDG table 614, which can comprise four fields: an ePDG identifier field 614a, a load field 614b, a FQDN field 614c, and an IP field, 614d.

Interface 608 can include one or more physical connections that can be either wired or wireless to communicate information to and from PGW 308. PGW 308 can transmit and receive radio, electrical, optical or other data signals on interface 608 to and from access networks (such as the Internet), to and from other network nodes (such as a MME, or HSS/AAA), and, in certain embodiments, to and from user equipment. Processor 602 can be one or more integrated circuits that are multipurpose, programmable, clock-driven, register-based electronic devices that accept binary data as input, processes it according to instructions stored in its memory, and provides results as output. In some embodiments, processor 602 can implement special modules such as ePDG selection module 610 and PCO manager 612, which will be described in further detail below. These modules may be software instances executed by Processor 602, dedicated hardware components of Processor 602, or be run by a combination of hardware and software within Processor 602.

Figure 7:
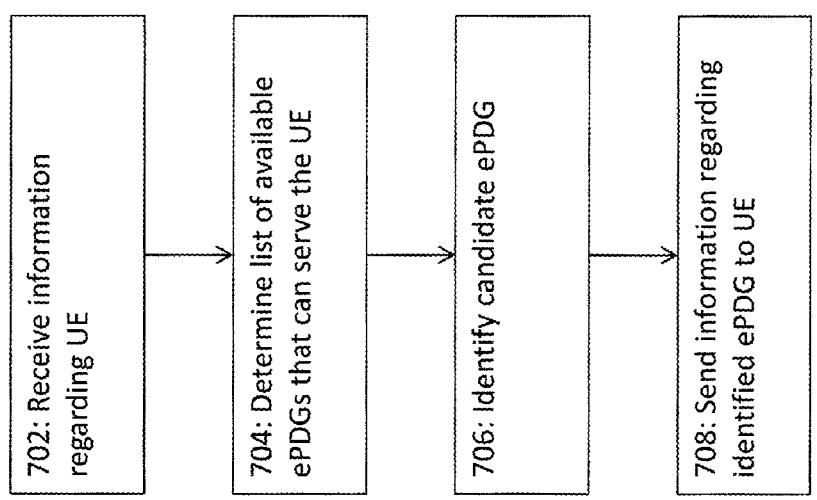
FIG. 7 is a flowchart depicting some exemplary steps by which a PGW can select and send information regarding an ePDG to a UE, in accordance with certain embodiments.

Memory 604 can be any type of computer readable medium such as random access memory (RAM), programmable read-only memory (PROM), a field programmable gate array (FPGA), flash memory, optical disk drive, or magnetic storage medium. Memory 604 can be used to store computer programs or logic that can be run on processor 602.

ePDG selection module 610 can be used to implement the ePDG selection method illustrated in FIG. 7. At a first step 702, ePDG selection module 610 can receive information regarding a UE via the transceiver 606 and interface 608. This information can include an IP address, a FQDN, a MCC and/or MNC, a subscriber identifier (e.g., a Network Access Identifier (NAI) and/or International Mobile Subscriber Identity (IMSI)) and/or subscriber class identifier (wherein subscribers can be differentiated according to service level (e.g., bronze/silver/gold), geographical region, service type, equipment type, or other divisions), a PLMN, and/or a geographic location associated with the UE. In some embodiments, this information can be received from the UE at the time when the UE first attaches to a LTE or other network via the PGW.

At step 704, ePDG selection module 610 can determine a list of available ePDGs that can serve the UE based on the received information. For example, ePDG selection module 610 can take into account which ePDGs stored in its ePDG table 614 are located in the same PLMN and/or geographic location as the UE, or can serve UEs with the received MCC, MNC and/or FQDN. In other embodiments, ePDG selection module 610 can take into account which ePDGs are available to serve the UE with the indicated subscriber identifier and/or subscriber class identifier. In yet other embodiments, ePDG selection module 610 can take into account which ePDGs are currently available or not available due to scheduled or unscheduled outages. In some embodiments, step 704 can require that the gateway 600 query an external network component, such as a HSS/AAA or a database indicating which ePDGs are currently functioning.

At step 706, ePDG selection module 610 can identify a candidate ePDG to send to the UE out of the list of available ePDGs determined in step 704. In some embodiments, this candidate ePDG can be selected using load balancing algorithms. As discussed above, a person of skill in the art would understand that load levels can be measured using a variety of parameters, including number of processes being hosted, number of connections and/or subscribers being hosted, CPU processor load, response delay time, and any other metric known in the art. Load information associated with each ePDG in the list of available ePDGs can be stored in ePDG table 614, in field 614b. Load balancing can be accomplished by, for example, selecting the ePDG out of the list of ePDGs that has the lowest load. Alternatively, load balancing can be accomplished using a round-robin algorithm, where each ePDG is selected in turn. Other embodiments known in the art are also possible.

At step 708, ePDG selection module 610 can send information regarding the identified ePDG to the UE. This can be done by using PCO manager 612 to generate a Protocol Configuration Option (PCO) message. As discussed above in relation to FIG. 5, PCO messages can be used to communicate information regarding the selected ePDG to the UE, including the IP address and FQDN of the selected ePDG. The IP address and FQDN of the selected ePDG can be drawn from fields 614c and 614d of ePDG table 614.

Figure 8:
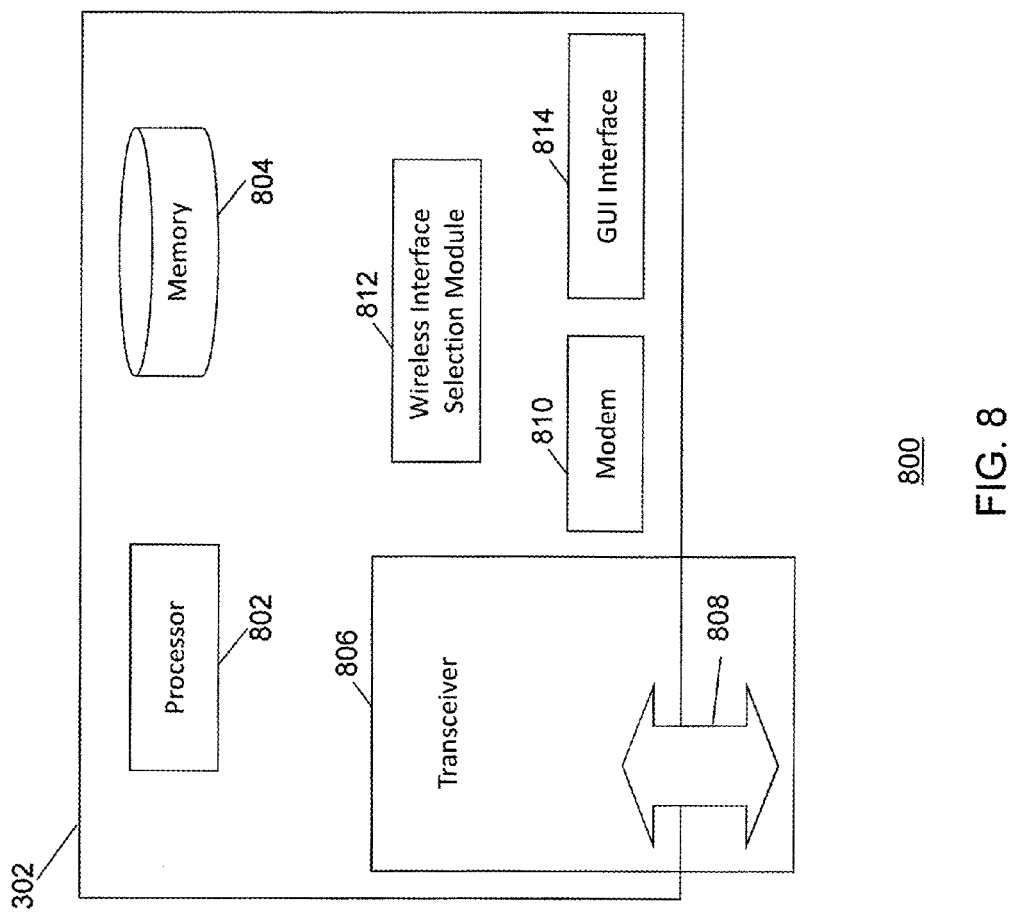
FIG. 8 is a logical diagram illustrating an exemplary UE, in accordance with certain embodiments.

FIG. 8 illustrates a logical view 800 of user equipment (UE) 302 in accordance with certain embodiments. The UE 302 can include a processor 802, a memory 804, a transceiver 806 including an interface 808, a modem 810, a wireless interface selection module 812, and a GUI interface 814.

The transceiver 806 includes a transmitter and a receiver. The transmitter and the receiver can be integrated into a single chip or can be embodied in separate chips. The transceiver 806 can also include an interface 808 that provides an input and/or output mechanism to communicate with other network devices. The interface 808 can measure the wireless signal strengths of wireless interfaces such as base stations and access points. The interface 808 can be implemented in hardware to send and receive signals in a variety of mediums, such as optical, copper, and wireless, and in a number of different protocols some of which may be non-transient.

The modem 810 is configured to implement modulation and framing of signals according to one or more communication standards. The communication standards include the cellular standards defined under 3GPP.

The wireless interface selection module 812 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 812 can select the serving wireless interface by analyzing data load information associated with wireless interfaces. In certain embodiments, the wireless interface selection module 812 can be configured to attach to a wireless interface handling the least amount of data traffic and/or with more available resources. In certain embodiments, the wireless interface selection module 812 can also analyze additional information to decide to which wireless interface to connect. For example, the wireless interface selection module 812 can use one or more of the following: the load condition associated with the candidate wireless interfaces, the wireless signal strength associated with the candidate wireless interfaces, and a configuration status on the wireless interface selection module 812 indicating whether the UE 302 favors the cellular network or the WLAN.

The wireless interface selection module 812 can be implemented in software using memory 804 such as a non-transitory computer readable medium, a programmable read only memory (PROM), or flash memory. The software can run on a processor 802 that executes instructions or computer code. The wireless interface selection module 812 may also be implemented in hardware using an application specific integrated circuit (ASIC), programmable logic array (PLA), or any other integrated circuit.

The GUI interface 814 can provide communication with an input and/or output mechanism to communicate with UE users. UE users can use input/output devices to send/receive data to/from the UE 302 over the GUI interface 814. Input/output devices can include, but are not limited to, a keyboard, a screen, a touch screen, a monitor, and a mouse. The GUI interface 814 can operate under a number of different protocols. The GUI interface 814 can be implemented in hardware to send and receive signals in a variety of mediums, such as optical, copper, and wireless.

The UE 302 described above can communicate with a plurality of radio access networks using a plurality of access technologies and with wired communication networks. The UE 302 can be a smart phone offering advanced features and capabilities, such as word processing, web browsing, gaming, e-book capabilities, an operating system, and a full keyboard. The UE 302 may run an operating system such as Symbian OS, iPhone OS, RIM's Blackberry, Windows Mobile, Linux, Palm WebOS, and Android. The screen may be a touch screen that can be used to input data to the UE 302 and the touch screen can be used instead of the full keyboard. The UE 302 may have the capability to run applications or communicate with applications that are provided by servers in the communication network. The UE 302 can receive updates and other information from these applications on the network.

The UE 302 also encompasses many other devices such as televisions (TVs), video projectors, set-top boxes or set-top units, digital video recorders (DVR), computers, netbooks, laptops, and any other audio/visual equipment that can communicate with a network. The UE 302 can also keep global positioning coordinates, profile information, or other location information in its stack or memory. The UE 302 can have a memory such as a computer readable medium, flash memory, a magnetic disk drive, an optical drive, a programmable read-only memory (PROM), and/or a read-only memory (ROM). The UE 302 can be configured with one or more processors 802 that process instructions and run software that may be stored in memory 804. The processor 802 can also communicate with the memory 804 and interfaces to communicate with other devices. The processor 802 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 302 can also provide a variety of user interfaces (e.g., GUI Interface 814) such as a keyboard, a touch screen, a trackball, a touch pad, and/or a mouse. The UE 302 may also include speakers and a display device in some embodiments.

Any of the network components specified in this disclosure, including without limitation PGW 308 and ePDG 306, can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 9:
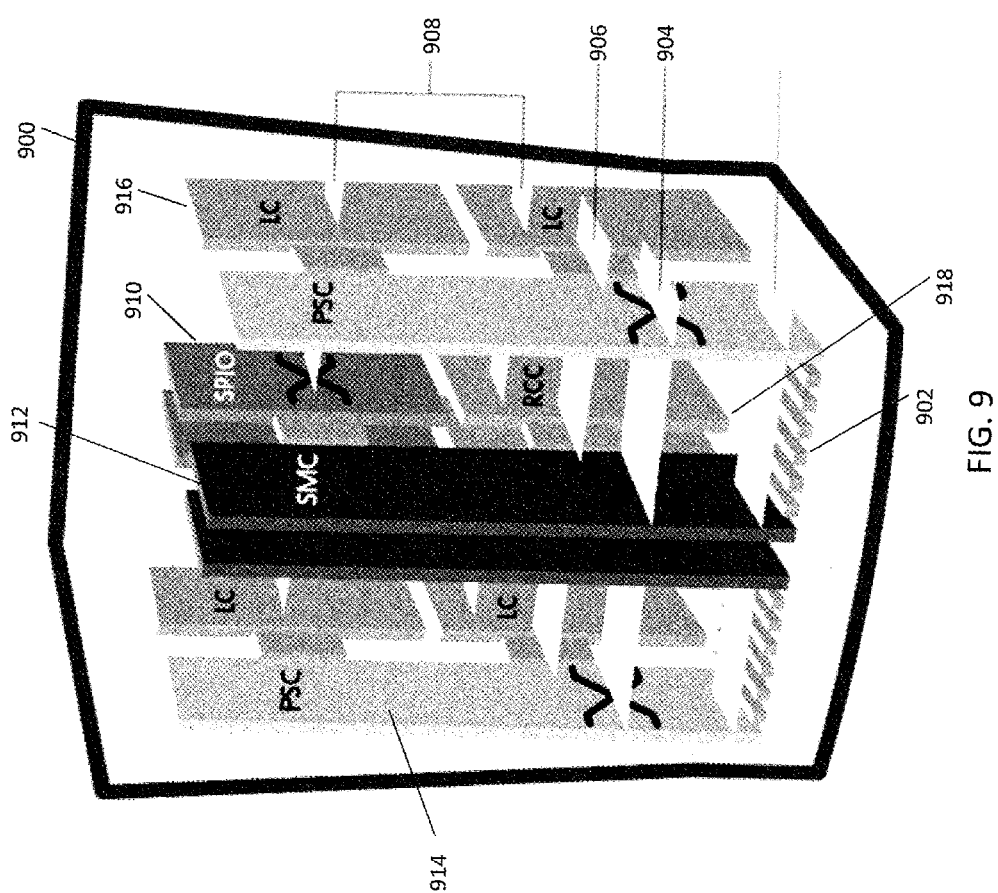
FIG. 9 illustrates the implementation of a network device, in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device 900 in accordance with some embodiments. The network device 900 includes slots 902 for loading application cards and line cards. A midplane can be used in the network device 900 to provide intra-network device communications, power connections, and transport paths between the various installed cards. The midplane can include buses such as a switch fabric 904, a control bus 906, a system management bus, a redundancy bus 908, and a time division multiplex (TDM) bus. The switch fabric 904 is an IP-based transport path for user data throughout the network device 900 implemented by establishing inter-card communications between application cards and line cards. The control bus 906 interconnects the control and management processors within the network device 900. The network device management bus provides management of system functions such as supplying power, monitoring temperatures, board status, data path errors, card resets, and other failover features. The redundancy bus 908 provides transportation of user data and redundancy links in the event of hardware failures. The TDM bus provides support for voice services on the system.

The network device 900 supports at least four types of application cards: a switch processor I/O card (SPIO) 910, a system management card (SMC) 912, a packet service card (PSC) 914, and a packet accelerator card (not shown). Other cards used in the network device 900 include line cards 916 and redundant crossbar cards (RCC) 918. The line cards 916, when loaded in the network device 900, provide input/output connectivity to the network and other devices, as well as redundancy connections. The line cards 916 include interfaces to the network through Ethernet, Fiber Optic, and/or any other communication mediums. The redundant crossbar card (RCC) 918 includes a non-blocking crossbar and connections to each of the cards in the network device 900. This allows a redundant connection to be made through the redundant crossbar card 918 from any one card to any other card in the network device 900. The SPIO card 910 serves as a controller of the network device 900 and is responsible for such things as initializing the network device 900 and loading software configurations onto other cards in the network device 900.

The system management card (SMC) 912 and switch processor card (not shown) are system control and management cards for managing and controlling other cards in the network device 900. The packet accelerator card (PAC) and packet service card (PSC) 914 provide packet processing, context processing capabilities, and forwarding capabilities among other things. The PAC and PSC 914 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 900 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 900 can be divided into a series of tasks that perform specific functions. These tasks communicate with each other as needed to share control and data information throughout the network device 900. A task is a software process that performs a specific function related to system control or session processing. Three types of tasks operate within the network device 900 in some embodiments: critical tasks, controller tasks, and manager tasks. The critical tasks control functions that relate to the ability of the network device 900 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 900) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A 10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 302), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 10:
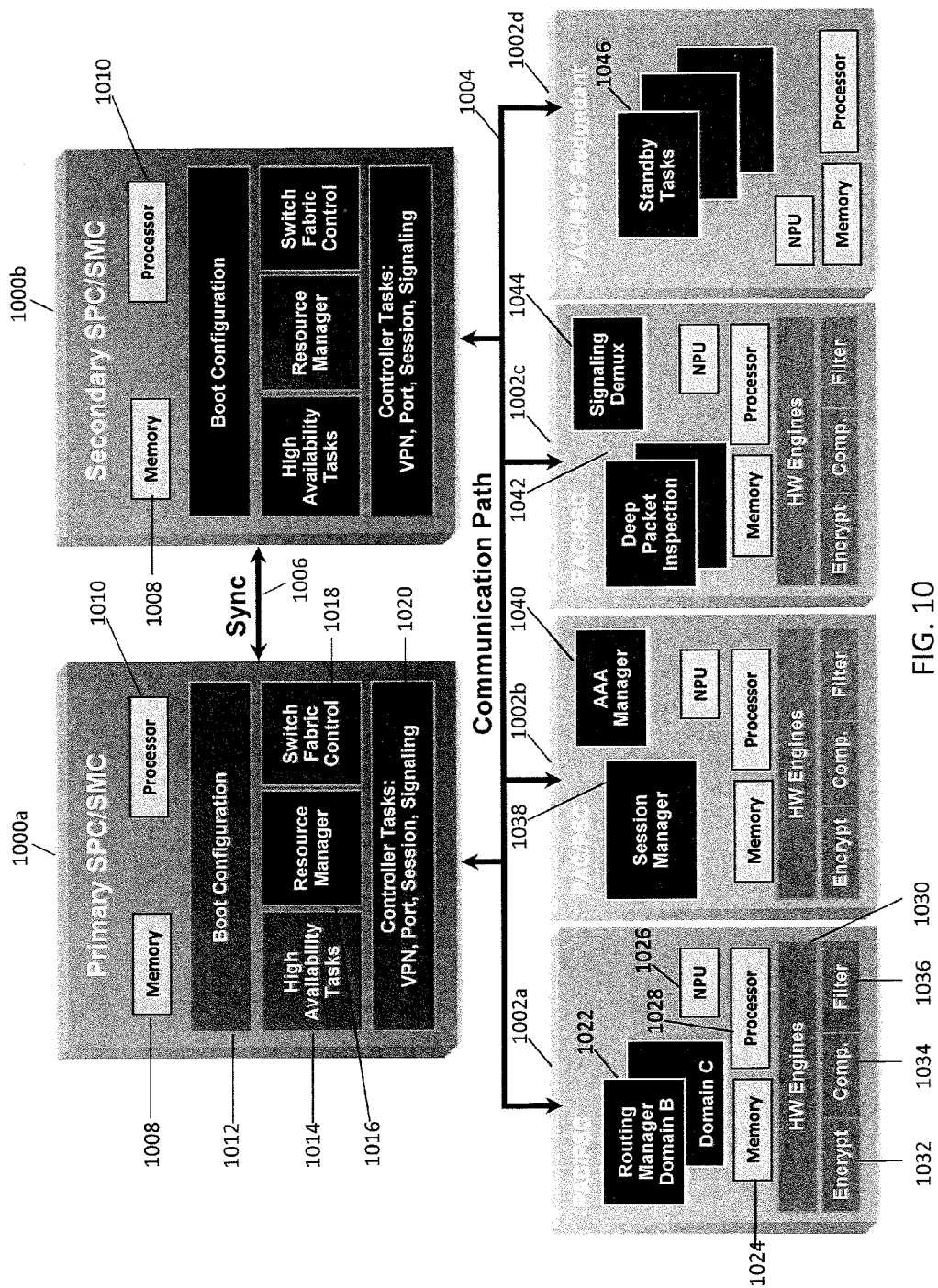
FIG. 10 is a logical view of the software architecture of a network device, in accordance with certain embodiments.

FIG. 10 illustrates a logical view 1000 of the software architecture of a network device (e.g., network device 900) in accordance with certain embodiments. As shown, the software and hardware can be distributed within the network device and across different circuit boards, processors, and memory. FIG. 10 includes a primary switch processor card (SPC)/system management card (SMC) 1000a, a secondary SPC/SMC 1000b, PAC/PSC 1002a-1002d, a communication path 1004, and a synchronization path 1006. The primary SPC/SMC 1000a and the secondary SPC/SMC 1000b each includes a memory 1008, a processor 1010, a boot configuration 1012, high availability tasks 1014, resource manager 1016, switch fabric control 1018, and controller tasks 1020.

The SPC/SMC 1000 (both primary and secondary) manages and controls the network device including the other cards in the network device. The SPC/SMC 1000 can be configured in a primary and secondary arrangement that provides redundancy and failsafe protection. The modules or tasks running on the SPC/SMC 1000 are related to network device wide control and management. The boot configuration task 1012 includes information for starting up and testing the network device. The network device can also be configured to startup in different configurations and providing different implementations. These can include which functionalities and services are capable of running on the SPC/SMC 1000. The high availability task 1014 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1000 or a PAC/PSC 1002, while some processor intensive tasks can also be performed across multiple PACs/PSCs to utilize multiple CPU resources. Distribution of these tasks is invisible to the user. The switch fabric control 1018 controls the communication paths in the network device. The controller tasks module 1020 can manage the tasks among the resources of the networks to provide, for example, VPN services, assign ports, and create, delete, and modify sessions for UE 302.

The PAC/PSC 1002 is a high-speed processing card that is designed for packet processing and the tasks involved with providing various network functionalities on the network device. The PAC/PSC 1002 include a memory 1024, a network processing unit (NPU) 1026, a processor 1028, a hardware engine 1030, an encryption component 1032, a compression component 1034, and a filter component 1036. Hardware engines 1030 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1002 is capable of supporting multiple contexts. The PAC/PSC 1002 is also capable of running a variety of tasks or modules. PAC/PSC 1002a provides routing managers 1022 with each covering routing of a different domain. PAC/PSC 1002b provides a session manager 1038 and an AAA manager 1040. The session manager 1038 manages one or more sessions that correspond to one or more UEs. A session allows a UE 302 to communicate with the network for voice calls and data. The AAA manager 1040 manages accounting, authentication, and authorization with an AAA server in the network. PAC/PSC 1002c provides a DPI task 1042 and a signaling demux 1044. The DPI task 1042 provides inspection of packet information beyond layer 4 for use and analysis by the network device. The signaling demux 1044 can provide scalability of services in combination with other modules. PAC/PSC 1002d provides redundancy through standby tasks 1046. Standby tasks 1046 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A packet data network gateway (PGW) comprising:
an interface;
a memory; and
a processor;
the PGW configured to:
receive information from a user equipment (UE) via a wireless network, wherein the UE is connected to the PGW via a first network;
determine, based on the received information, a list of available evolved packet data network gateways (ePDGs) that can serve the UE if the UE connects to a second network, wherein the first network and the second network employ different access technologies;
identify a single candidate ePDG out of the list of available ePDGs; and
send a network address of the single candidate ePDG to the UE via the first network;
wherein, the PGW is configured to identify the single candidate ePDG out of the list of available ePDGs based on load information associated with the list of available ePDGs, the PGW configured to store the load information.

2. The PGW of claim 1, wherein the first network is a cellular access network, and the PGW is configured to send the network address of the single candidate ePDG to the UE via a Protocol Configuration Option (PCO) message.

3. The PGW of claim 1, wherein the first network is a Long Term Evolution (LTE) network and the second network is a Wireless Local Area Network (WLAN).

4. The PGW of claim 1, wherein the PGW is further configured to send to the UE a Fully Qualified Domain Name (FQDN) of the single candidate ePDG and an Internet Protocol (IP) address of the PGW in a single PCO message.

5. The PGW of claim 1, wherein at least one of the PGW and at least some of the ePDGs in the list of available ePDGs are implemented as virtual software instances in a cloud-based environment.

6. A method for transferring a user equipment (UE) connected to a first network to a second network, the method comprising:
receiving, at a packet data network gateway (PGW), information from the UE, wherein the UE is connected to the PGW via the first network;
determining, based on the received information, at the PGW, a list of available evolved packet data network gateways (ePDGs) that can serve the UE if the UE connects to the second network, wherein the first network and the second network employ different access technologies;
identifying, at the PGW, a single candidate ePDG out of the list of available ePDGs; and
sending, from the PGW, a network address of the single candidate ePDG to the UE via the first network;
wherein, the identification of the single candidate ePDG out of the list of available ePDGs is based on load information of the list of available ePDGs, the PGW configured to store the load information.

7. The method of claim 6, wherein the first network is a cellular access network, and wherein the network address of the single candidate ePDG is sent from the PGW to the UE via a Protocol Configuration Option (PCO) message.

8. The method of claim 6, wherein the first network is a Long Term Evolution (LTE) network and the second network is a Wireless Local Area Network (WLAN).

9. The method of claim 6, further comprising sending, from the PGW to the UE, a Fully Qualified Domain Name (FQDN) of the single candidate ePDG and an Internet Protocol (IP) address of the PGW.

10. The method of claim 6, wherein at least one of the PGW and at least some of the ePDGs in the list of available ePDGs are implemented as virtual software instances in a cloud-based environment.

11. A method for transferring a user equipment (UE) connected to a first network and to a second network, the method comprising:
- connecting the UE to the first network;
- receiving, in a Protocol Configuration Option (PCO) message at the UE from a packet data network gateway (PGW), via the first network, (i) a first network address identifying an evolved packet data network gateway (ePDG) that can serve the UE if the UE connects to the second network, wherein the first network and the second network employ different access technologies, and (ii) a second network address identifying the PGW, wherein the first network address identifying the ePDG is included within a first container of the PCO message and the second network address identifying the PGW is included within a second container of the PCO message, wherein the first container includes a first operator specific container ID and the second container includes a second operator specific container ID;
- terminating the UE's connection to the first network; and
- sending, from the UE, via the second network, a request to connect to (i) the ePDG identified by the first network address, and (ii) the PGW identified by the second network address;

wherein, the identification of the ePDG by the first network address is selected from a list of available ePDGs based on load information, the PGW configured to store the load information.

12. The method of claim 11, wherein the first network is a cellular access network, and the UE receives the first network address and the second network address via a Protocol Configuration Option (PCO) message.

13. The method of claim 11, wherein the first network is a Long Term Evolution (LTE) network and the second network is a Wireless Local Area Network (WLAN).

14. The method of claim 11, wherein the request sent from the UE via the second network comprises a first message requesting a connection with the ePDG identified by the first network address, and a second message requesting a connection with the PGW.

15. The method of claim 11, wherein the request comprises an Internet Key Exchange (IKEv2) authentication request, and wherein the second network address is included in an ID_KEY_ID field.

16. The method of claim 11, wherein at least one of the PGW and the ePDG are implemented as virtual software instances in a cloud-based environment.

* * * * *

UNITED STATES PATENT AND TRADEMARK OFFICE
CERTIFICATE OF CORRECTION

PATENT NO. : 9,794,771 B2  
APPLICATION NO. : 14/448318  
DATED : October 17, 2017  
INVENTOR(S) : Sujesh Kumar Raveendran Page 1 of 1

It is certified that error appears in the above-identified patent and that said Letters Patent is hereby corrected as shown below:

In the Specification

In Column 6, Line 23, delete "SGSN/MEE" and insert -- SGSN/MME --, therefor.

In Column 6, Line 28, delete "mutli-user" and insert -- multi-user --, therefor.

In Column 17, Line 54, delete "A 10/A11" and insert -- A10/A11 --, therefor.

In Column 17, Line 57, delete "Diffsery" and insert -- Diffserv --, therefor.

In the Claims

In Column 21, Line 2, in Claim 11, after "network" delete "and".

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*